No. 663,108.  
J. C. TODD.  
MUZZLE.  
(Application filed June 12, 1900.)

Patented Dec. 4, 1900.

(No Model.)

WITNESSES  
Chapman N. Fowler  
Lowell Bartle

INVENTOR  
James Charles Todd.  
by T. Walter Fowler  
his Attorney

UNITED STATES PATENT OFFICE.

JAMES CHARLES TODD, OF PHILADELPHIA, PENNSYLVANIA.

MUZZLE.

SPECIFICATION forming part of Letters Patent No. 663,108, dated December 4, 1900.

Application filed June 12, 1900. Serial No. 20,043. (No model.)

*To all whom it may concern:*

Be it known that I, JAMES CHARLES TODD, a citizen of the United States, residing at Philadelphia, in the county of Philadelphia and State of Pennsylvania, have invented new and useful Improvements in Muzzles, of which the following is a specification.

This invention relates to devices to be applied to the heads of animals, and especially canines, and commonly designated as "muzzles;" and it consists, essentially, of a muzzle including a folded strap the members whereof cross each other at a point in their length to form independent loops, one adapted to embrace the jaws and the other the rear portion of the head of the animal.

It also consists of the parts and the construction and arrangement of parts forming the muzzle, which I will hereinafter describe and claim.

Figure 1:
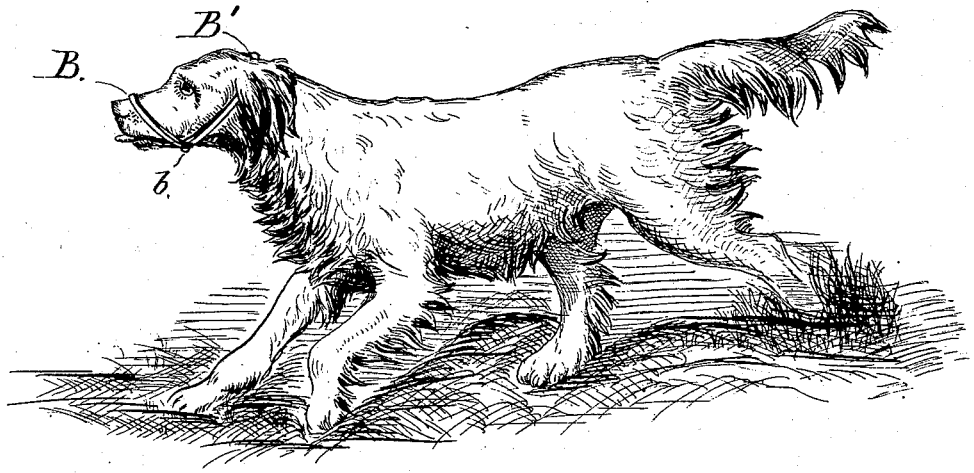
Figure 2:
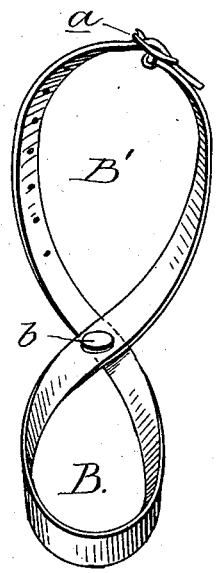

In the accompanying drawings, forming part of this specification, and in which similar letters of reference indicate corresponding parts, Figure 1 illustrates the application of my muzzle to the head of a dog. Fig. 2 is a view of the muzzle detached.

In carrying out my invention I use a strap made of leather, canvas, or other appropriate material and of any desired width. This strap is folded at or near its center, and one of its ends is provided with a member of a fastening device, and the opposite end is likewise provided with means adapted to be engaged by said member to secure the free ends of the strap together. As shown in the drawings, the fastening devices are of a conventional form and comprise a buckle $a$, secured to one end of the strap, and a series of holes or eyelets in the opposite end of the strap adapted to be engaged by said buckle to detachably and adjustably secure the free ends of the members of said strap. The middle portion of the folded strap is given a partial twist, and at some point in the length of the strap the members thereof cross each other flatwise and are united, as by a rivet $b$ or other means, the free ends of the members being then brought together and united by the buckle or fastening device before alluded to.

The result of the crossing of the members of the strap, as indicated, is to produce two loops or bights, one on each side of the rivet or point of fastening. One of these loops B is designed to receive the nose and embrace the upper and lower jaws of the dog or other animal, while the other and larger loop B' is fitted to and embraces the rear part of the head, the members of the strap forming this rear loop B' passing upwardly and rearwardly from the point of crossing of the strap and after passing behind the ears of the animal have their free ends secured by the fastening devices.

As shown in Fig. 1, the loops diverge from the point of crossing, the smaller or nose loop extending forwardly and upwardly and the larger or rear loop extending upwardly and rearwardly. This places the point of crossing of the strap under the lower jaw and at a place where it will produce the least annoyance, the arrangement being such that the jaws of the animal are comfortably inclosed by a flexible strap connection, and any effort on the part of the animal to open its mouth beyond the limits allowed by the muzzle for breathing and drinking purposes will result in the pressure of the lower jaw upon the crossed portion of the strap being transmitted to the loops, thereby drawing the forward loop B hard down upon the nose of the animal and likewise drawing the rear loop down upon the head just in rear of the base of the ears.

The muzzle is formed of a single strap and is light, strong, and secure. It is cheap in its construction, efficient in its use, and is comfortable to a high degree, while at the same time it answers all of the requirements of a practical muzzle. It permits freedom to the head, it allows the animal to breathe and drink without restraint, and when worn prevents the animal biting.

Having thus described my invention, what I claim as new, and desire to secure by Letters Patent, is—

1. A muzzle including a folded strap the members whereof cross each other at a point in their length to form independent loops one adapted to embrace the jaws and the other the rear portion of the head of the animal the said members being united at their point of crossing.

2. A muzzle including two flexible loops connected at their meeting portions one of said loops adapted to embrace the nose and jaws of the animal and the other fitted to the rear portion of the head back of the ears.

3. A muzzle including a strap folded to form a loop or bight and having its members brought together flatwise and secured at the point of crossing, said members thence extended in opposite directions and adapted to form a second loop, and means for detachably uniting the free ends of said members.

In testimony whereof I have hereunto set my hand in presence of two subscribing witnesses.

JAMES CHARLES TODD.

Witnesses:
L. READ FULTON,
FRANK B. JAQUETT.